INVENTOR
Alfredo Roque V

United States Patent Office 3,238,988
Patented Mar. 8, 1966

3,238,988
TIRE
Alfredo Roque V, Apartado 952, Managua, Nicaragua
Filed Feb. 23, 1965, Ser. No. 434,325
1 Claim. (Cl. 152—156)

This invention relates to a vehicle tire which is used without an innertube or internal air pressure.

So-called airless tires are known which use metal wires, either individually or in the form of wire meshes, such as disclosed by Kunel, U.S. Patent No. 2,749,959. These tires have not been generally successful. Also, the use of sponge rubber fillings in the construction of pneumatic tires has been suggested, as by Tennant, U.S. Patent No. 744,436. Despite these prior art disclosures, a practical airless vehicle tire has not been produced heretofore.

The object of this invention is to produce a practical airless and punctureless tire. Another object is to produce a puncture-proof tire which will give a vehicle a cushioned ride analogous to a pneumatic tire when the vehicle is driven at relatively low speeds over a rough road surface. In general, the objects of the invention are accomplished by using a plurality of approximately parabolic shaped resilient spring steel wires extending radially of the tire and with the free ends of these wires secured to the beads of the tire. The distance between the beads in the dismounted tire is greater than the width of the rim of the wheel upon which the tire is to be mounted. The tire employs a parabolic shaped carcass or casing which has an inner wall of larger curvature than that of the wires so that spaces are formed between the wires and the inner wall of the casing. These spaces are filled with a sponge rubberlike cushion material. When the tire is mounted on the rim of a wheel, the beads are pulled toward each other and force the wires and casing into a semi-circular shape, thus compacting the rubberlike filling material between the wires and casing with the result that the steel wires are put under stress and are urged into the cushion material against the inner wall of the casing with an even distribution of pressure. This binds the wires firmly to the casing and substitutes the mechanical stress on the wires for the air pressure in a pneumatic tire.

The means by which the objects of the invention are obtained are described more fully with reference to the accompanying drawings in which.

Figure 1:
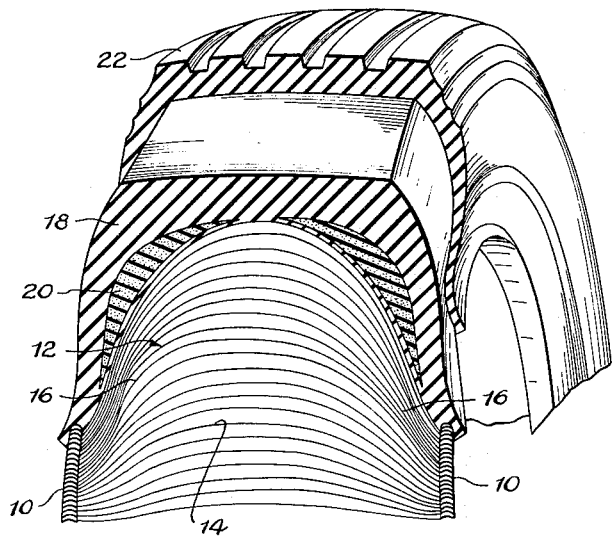
FIGURE 1 is a perspective view of a segment of a tire partly shown in section and with the wires exposed.

As shown in the drawings, the tire is composed of a pair of spaced metal beads 10. The free ends of a plurality of wires 12 are fastened to beads 10, and each of which has a bight portion 14 between outwardly curved leg portions 16 which extend radially of said tire. The carcass or casing 18 encloses the wires 12. As manufactured, both the casing 18 and the wires 12 have a parabolic shape, with the casing having an inner wall of larger curvature than that of wires 12. This leaves spaces between the outer surfaces of the wires and the inner surface of the casing, which spaces are filled with a sponge rubberlike material cushion 20. The tire is finished with a tread 22 which can be extended to form an inner wall 24 covering the inner surfaces of wires 12. If desired, a separate rubber layer can be used for the inner covering 24.

Figure 2:
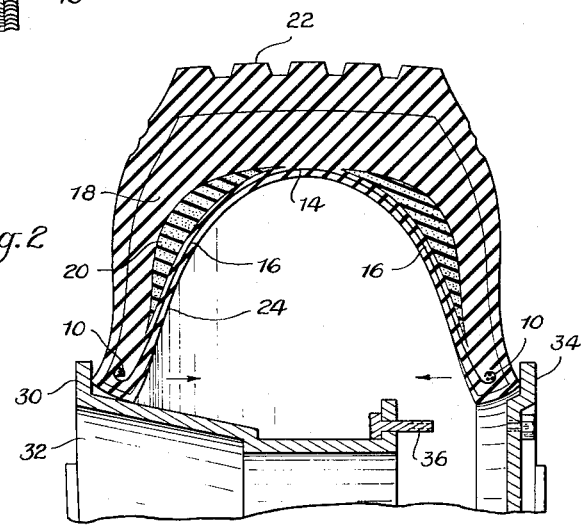
FIGURE 2 is a cross-sectional view of the tire before being mounted on the rim of a wheel.

As shown in FIGURE 2, the tire is dismounted, and about to be mounted on the rim 30 of a wheel 32. In the example illustrated, a split wheel analogous to that disclosed by Costello, U.S. Patent No. 1,394,252, is used in which a separate wheel side 34 is forced inwardly to bring the beads toward each other.

Figure 3:
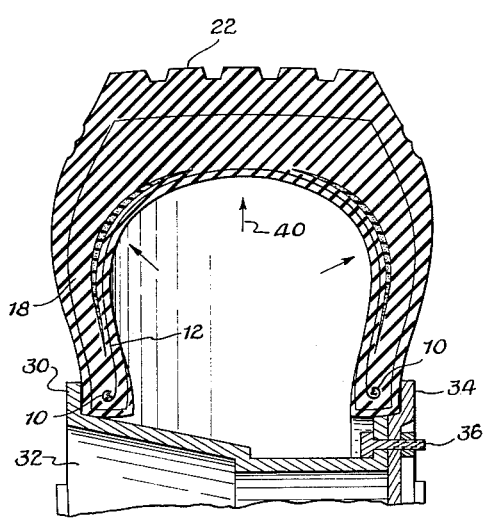
FIGURE 3 is a similar view of the tire mounted on the wheel.

The mounted tire is shown in FIGURE 3. The beads 10 have been brought in toward each other and the side 34 secured by a bolt 36, thus producing a stress on the wires 12 which alters the curvature of the wires from a parabolic into substantially semi-circular shape in conformity with the newly acquired curvature of the inner wall of the casing. This has the effect of producing a stress in the wires 12 and a pressure in the direction of the arrows 40 so that the cushion material 20 is compacted and the wires firmly bound thereby to the inner wall of the casing. At the same time, the wires distribute a uniform pressure over the inner wall of the casing and produce a mechanical pressure against the casing which takes the place of the air pressure in a pneumatic tire. The individual wires are kept separate from each other by reason of the cushion material 20 and the inner coating 24 so that the wires will not rub against each other and create frictional heat.

The tire of this invention has the advantage of being puncture-proof while producing a cushioning effect analogous to a pneumatic tire when being used on rough road surfaces at relatively low speeds. Also, because of the separation of the wires 12 by the cushion material 20, the tire can be driven at moderate road speeds without becoming excessively hot. A further advantage is that, when the tire flexes while being rolled over a road surface, the cushion material 20 keeps a bond between the wires and the casing even though the wires and casing assume different curvatures when flexed.

Having now described the means by which the objects of this invention are obtained,

I claim:

A vehicle tire comprising a pair of spaced annular beads, a plurality of generally parabolic shaped resilient steel wires each having their free ends attached to said beads, curved legs extending radially of said tire, and bights extending between said legs, said wires being spaced uniformly around the periphery of said tire, a parabolic shaped tire casing having an inner wall of greater curvature than said wires and surrounding said wires, a rubberlike cushion material enclosing the curved portions of the wires between the wires and casing and being in expanded condition when said tire is not on a wheel, said beads being spaced a distance greater than the width of a tire rim when the tire is dismounted so that said cushion is compacted when the beads are drawn together when mounted on a tire rim to bend the wires and casing into substantially semi-circular shape, and to uniformly distribute the pressure of the wires through the compacted cushion against said casing.

References Cited by the Examiner

UNITED STATES PATENTS

| 744,436 | 11/1903 | Tennant | 152—313 X |
|---|---|---|---|
| 1,229,861 | 6/1917 | Auberlin | 152—156 X |

ARTHUR L. LA POINT, *Primary Examiner.*

C. W. HAEFELE, *Assistant Examiner.*